(12) United States Patent
Mullan

(10) Patent No.: US 6,837,518 B2
(45) Date of Patent: Jan. 4, 2005

(54) REINFORCEMENT STRUCTURE FOR INSTRUMENT PANEL

(75) Inventor: Brian J. Mullan, Windsor (CA)

(73) Assignee: L&W Engineering Incorporated, Belleville, MI (US)

( * ) Notice: Subject to any disclaimer, the term of this patent is extended or adjusted under 35 U.S.C. 154(b) by 27 days.

(21) Appl. No.: 10/227,320

(22) Filed: Aug. 23, 2002

(65) Prior Publication Data

US 2004/0036264 A1 Feb. 26, 2004

(51) Int. Cl.⁷ .................. B60R 21/02; B60R 21/045
(52) U.S. Cl. ............ 280/752; 296/193.02; 296/203.02; 296/187.05; 296/72; 188/377
(58) Field of Search .................. 280/752; 296/193.02, 296/187.05, 203.02, 70, 72; 188/371, 377

(56) References Cited

U.S. PATENT DOCUMENTS

| | | | |
|---|---|---|---|
| 3,599,757 A | * 8/1971 | Takamatsu et al. | ......... 188/371 |
| 3,924,707 A | * 12/1975 | Renner et al. | ............... 180/90 |
| 5,037,130 A | * 8/1991 | Okuyama | ................... 280/752 |
| 5,071,162 A | 12/1991 | Takagawa | |
| 5,096,223 A | 3/1992 | Tekelly et al. | |
| 5,413,379 A | 5/1995 | Koma | |
| 5,584,509 A | 12/1996 | Tekelly et al. | |
| 5,632,507 A | * 5/1997 | Sinner et al. | ............... 280/751 |
| 5,865,468 A | 2/1999 | Hur | |
| 5,927,755 A | 7/1999 | Matsuo et al. | |
| 5,931,520 A | 8/1999 | Seksaria et al. | |
| 5,934,733 A | 8/1999 | Manwaring | |
| 6,050,628 A | 4/2000 | Allison et al. | |
| 6,145,880 A | 11/2000 | White et al. | |
| 6,176,544 B1 | 1/2001 | Seksaria et al. | |
| 6,213,504 B1 | 4/2001 | Isano et al. | |
| 6,299,208 B1 | * 10/2001 | Kasahara et al. | ........... 280/752 |
| 6,554,352 B2 | * 4/2003 | Nagy | ................... 296/203.02 |
| 2003/0057692 A1 | * 3/2003 | Horsch et al. | ............... 280/752 |

FOREIGN PATENT DOCUMENTS

JP 2001-163120 * 6/2001

* cited by examiner

Primary Examiner—David R. Dunn
Assistant Examiner—George D Spisich
(74) Attorney, Agent, or Firm—Harness, Dickey & Pierce, P.L.C.

(57) ABSTRACT

An energy absorbing knee bolster for use in an interior of a vehicle is disclosed. The knee bolster is configured to absorb energy from the vehicle's occupants during a crash. The knee bolster is formed of a collapsible cylinder which is welded to an impact plate on its first end and to a vehicle's cross-car beam at its second end. A coupling flange is disposed between the impact plate and a medial portion of the collapsible cylinder. The collapsible cylinder is configured to axially collapse at a predetermined force when impacted by a moving occupant.

15 Claims, 6 Drawing Sheets

REINFORCEMENT STRUCTURE FOR INSTRUMENT PANEL

FIELD OF THE INVENTION

The present invention relates to an instrument panel reinforcement structure for motor vehicles, and more particularly to a tubular support structure for a knee bolster.

BACKGROUND OF THE INVENTION

Critical to the fundamental development of a restraint system are the concepts of occupant energy management and occupant kinematics. In this regard, Federal Motor Vehicle regulations provide load limitations for various anatomical features of a seated occupant in a forward crash. These load limitations generally have been set to reduce the overall percentage chance of an injury for a given anatomical feature caused by a vehicle crash at a specific vehicle crash speed.

The individual components of a restraint system must be designed with the view of the other components in the restraint system, as well as the specific vehicle geometry. For example, the stiffness of an airbag cushion must be designed with view of the stiffness of a vehicle's steering column, windshield slope, and instrument panel stiffness. As such, it is very desirable during the development of a restraint system to have components which have easily modifiable engineering properties.

One integral component in any restraint system is the lower portion of the instrument panel or knee bolster. In this regard, the knee bolster functions to absorb a significant amount of an occupant's impact energy during a crash event. Further, the knee bolster is critical in a regulation of an occupant's kinematics. Specifically, the knee bolster regulates the angle an occupant rotates about its hip to encounter a deploying airbag. The regulation of the occupant's kinematics is a function of the load the knee bolster imparts onto an occupant's knees as well as the displacement of the knee bolster with respect to the vehicle. The travel of an occupant's hips within the vehicle is closely related to the translation of the knee bolster. It is known by those skilled in the art that the adjustment of the stiffness of the knee bolster can be used to reduce the likelihood an occupant will hit a windshield for an unbelted occupant during a crash event, by reducing the amount of rotation of an occupant's torso.

As such, it would be desirable to have a knee bolster for use in a restraint system which has engineering properties that can be easily tuned based upon vehicle geometry, occupant loading, and occupant displacement. It also would be desirable to provide a knee bolster which provides a steady state loading of an occupant's femurs so as to absorb as much energy during a crash event without exceeding government and industry set safety standards.

It is an object to the present invention to provide an instrument panel which overcomes the disadvantages of present knee bolster systems. Specifically, it is an object of the present invention to provide a highly tunable knee bolster which provides steady state loading of an occupant's lower extremities during a crash event.

SUMMARY OF THE INVENTION

In accordance with the teachings of the present invention, an energy absorbing knee bolster for use in an interior of a vehicle is disclosed. The knee bolster is configured to absorb energy from the vehicle's occupants during a crash. The knee bolster is formed of a collapsible cylinder which is welded to an impact plate on its first end and to a vehicle's cross-car beam at its second end. A coupling flange is disposed between the impact plate and a medial portion of the collapsible cylinder. The collapsible cylinder is configured to axially collapse at a predetermined force when impacted by a moving occupant.

In one preferred embodiment, a knee bolster having a collapsible cylinder with a first end and a medial portion is disclosed. An impact plate is coupled to the first end, while a coupling flange is coupled to the impact plate and to the medial portion of the collapsible cylinder. The collapsible cylinder is configured to axially collapse at a predetermined force when impacted by the moving occupant.

In another embodiment of the invention, an energy absorbing support structure configured to support an instrument panel within a vehicle is disclosed. The energy absorbing structure has a tubular means for absorbing occupant impact energy and an impact plate coupled to said tubular means for absorbing occupant energy. A coupling bracket is disposed between the impact plate and the tubular means for absorbing impact energy. The coupling bracket is configured to encourage the collapse of the tubular means for absorbing energy in a telescopic fashion.

In yet another embodiment of the invention, a cross-car beam is disclosed. The cross car beam is formed by a first member, which is disposed between two points with a vehicle compartment and a collapsible cylinder having first and second ends. The second end of the collapsible cylinder is coupled to the first member. An impact plate is coupled to the first end of the collapsible cylinder. A coupling flange coupled to the impact plate and to the collapsible cylinder. The collapsible cylinder is configured to axially collapse any predetermined force when impacted by a vehicle occupant.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment is merely exemplary in nature and is in no way intended to limit the invention, its application, or uses.

Figure 1:
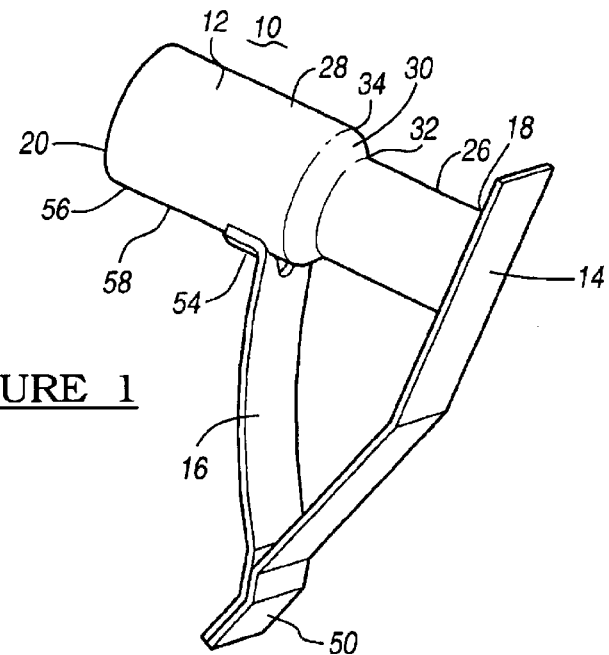
FIG. 1 represents a perspective view of a knee bolster bracket according to the teachings of the present invention.
Figure 2:
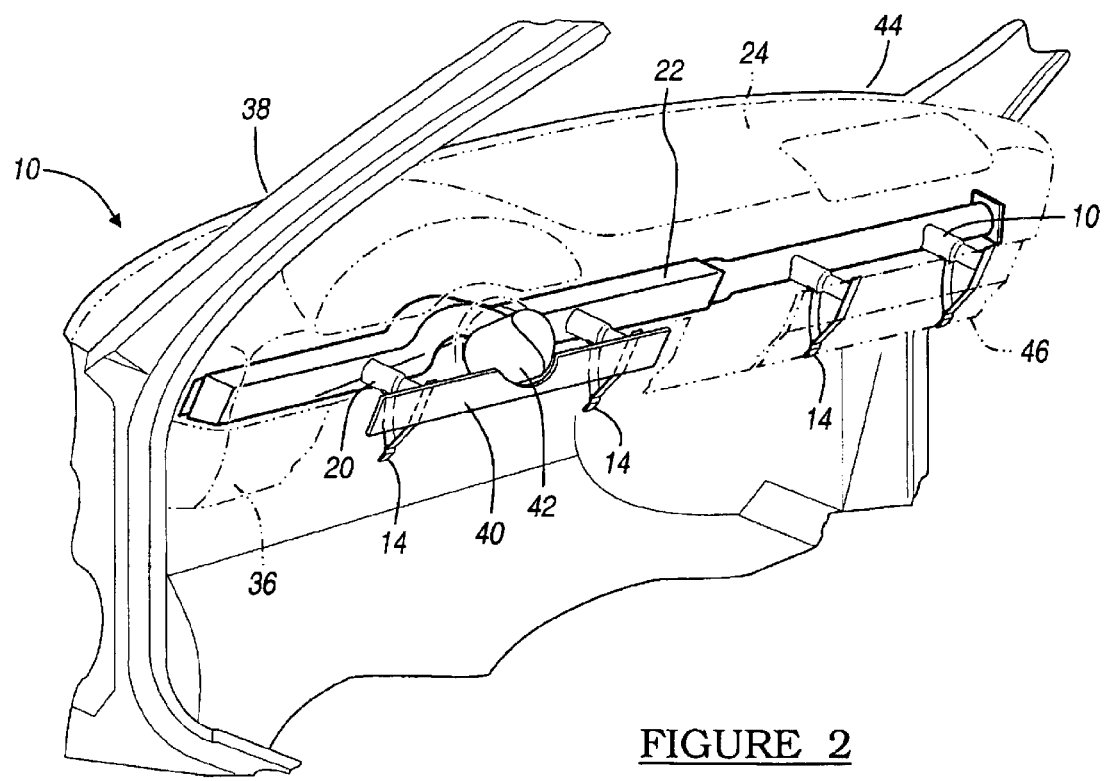
FIG. 2 depicts a perspective view of the knee bolster bracket according to the teachings of the present invention in an automobile environment.
Figure 3:
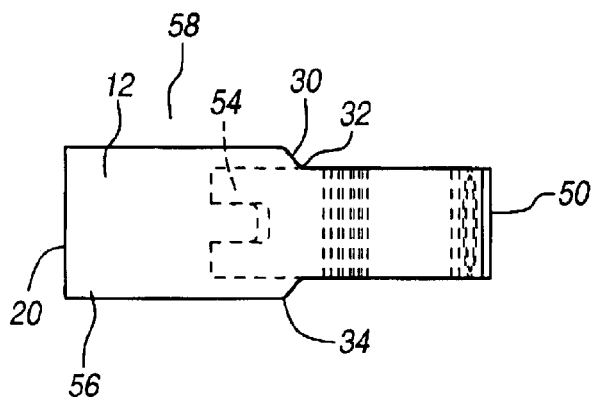
FIG. 3 depicts a top view of the knee bolster bracket according the teachings of the present invention.

FIGS. 1–5 represent the knee bolster support bracket 10 according to the teachings of the present invention. The bracket 10 is formed of three general components, a cylindrical or tubular member 12, a first impact plate 14, and a coupling bracket 16. Generally, the impact plate 14 is welded to a first end 18 of the tubular member 12. As best seen in FIG. 2, the tubular member 12 is welded at its second end 20 to a cross-car beam 22 of a vehicle instrument panel 24. The tubular member 12 is formed of a single steel tube which is plastically deformed to form first and second tubular members 26 and 28. Generally, the diameter of the second tubular member 28 is set so the first tubular member 26 can be forced into the second tubular member 28 by deformation of the transition portion 30. While the tubular member 12 is shown having a circular cross section, it is envisioned the tubular member 12 can have other closed cross sections such as an oval, square, or rectangle.

The tubular member 12 is preferably formed of 1008 or 1010 mild steel. The first tubular member 26 preferably has a diameter from about 1.25 to 1.75 and most preferably 1.5 inches, while the second tubular member 28 preferably has a diameter of from about 1.75 to 2.25 and most preferably 2 inches. The tube wall preferably has a thickness from about 0.5 to about 2 millimeters. The outer diameter of the first tubular member 26 is smaller than the outer diameter of the second tubular member 28, and most preferably smaller than an inner diameter of the second tubular member 28.

As best seen in FIG. 2, the impact plates 14 generally conform to the shape of a knee bolster facia 36 and has a thickness between about 1.5 to about 2.5 mm, and preferably about 2.0 mm. With respect to the driver side 38 of the vehicle, a plate 40 is disposed between a pair of knee bolster brackets 10. This plate 40 is preferably made of sheet steel which is welded using spot welding techniques or mechanically fastened to the impact plate 14. Disposed between the brackets 10 on the driver's side is a steering column 42. It is envisioned that the brackets 10 would be positioned adjacent the steering column 42 so as to reduce the likelihood an occupant's knee will interact with the steering column 42 member.

Disposed between the tubular sections 26 and 28 is a transition portion 30 having generally concave and convex sections 32 and 34. The forces needed to collapse the tubular member 12 are a function of the stiffness, thickness, and the geometry of the transition portion 30. Specifically, they are a function of the diameter of the tubular members 26 and 28.

FIG. 2 additionally shows the coupling of the knee bolster brackets 10 to the vehicle cross-member 22 in the passenger side 44 of the vehicle. In this regard, the brackets 10 will be positioned so that the impact plates 14 are positioned adjacent to or will form a portion of the glove box door frame 46. The forces from a passenger's knees into the glove box door is transferred through the frame 46 to the brackets 10.

Figure 5:
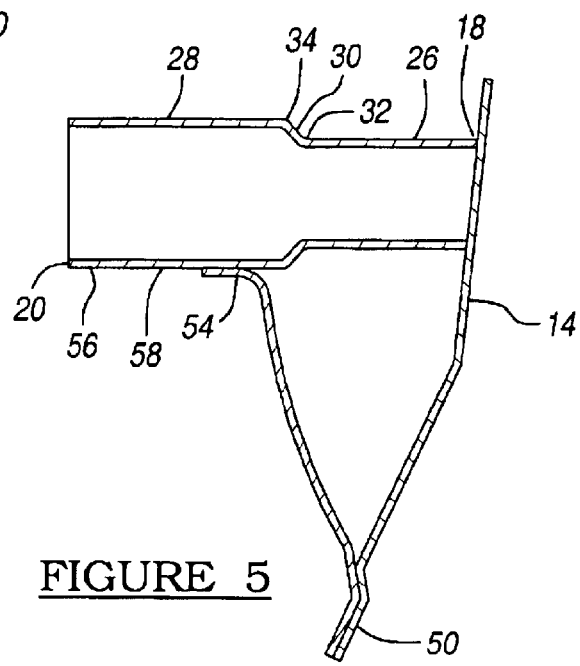
FIGS. 4 and 5 represent side views of the knee bolster bracket according to the present invention.
Figure 4:
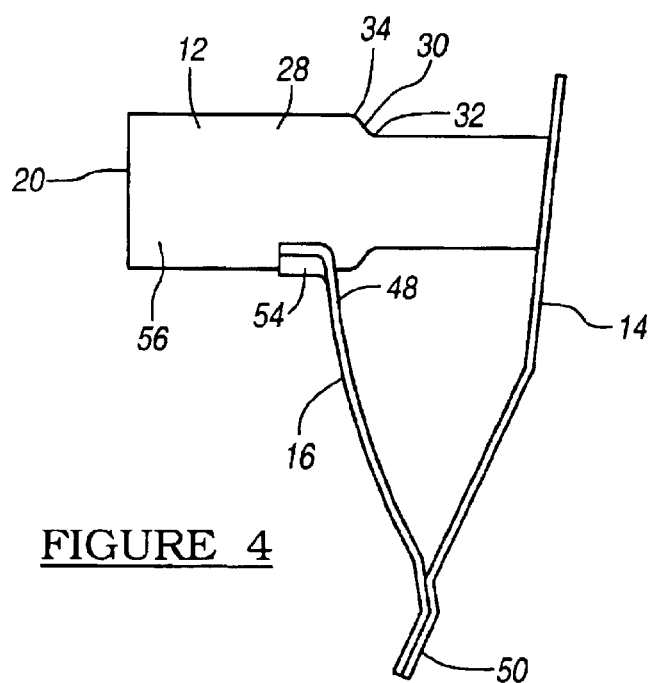

As it is best seen in FIGS. 4 and 5, the impact plate 14 is welded generally perpendicular to the first end 18 of the tubular member 12. The generally perpendicular placement of the impact plate 14 with respect to the first tubular member 26 allows for the proper axially linear transfer of energy from the impact plate 14 to the tubular member 12.

The coupling bracket 16 is welded to a medial portion 58 of the tube 12 and specifically to the second tube member 28 at a coupling member first end 48. Additionally, the coupling bracket 16 is welded at its second end 50 to the impact plate 14. The first end 48 of the coupling bracket 16 has a defined notch 52 which forms a pair of forked members 54. These forked members 54 are bent to be generally parallel to an exterior surface 56 of the second tube portion 28 and are coupled to the tubular member 12 using general welding techniques.

Figure 6:
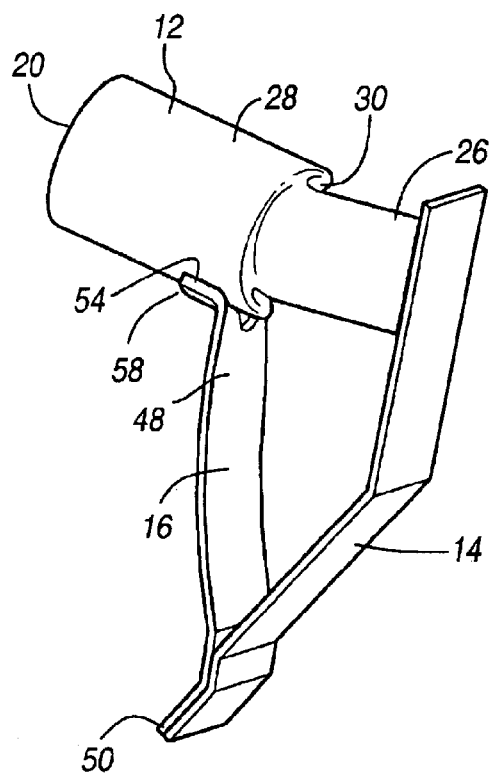
FIGS. 6 and 7 depict collapsed knee bolster brackets according to the teachings of the present invention.
Figure 7:
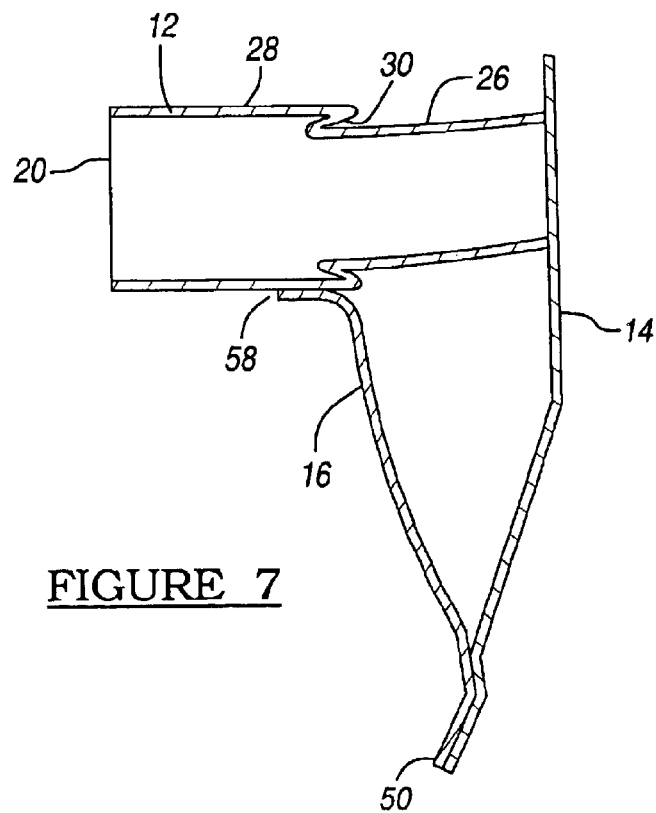

As best seen in FIGS. 4 and 5, the coupling brackets 16 define a generally concave shape with respect to the impact plate 14. In this regard, the coupling bracket 16 regulates the off-axis collapsing of tubular member 12 to provide relatively steady-state reaction forces to the occupant's femurs. As best seen in FIGS. 6 and 7, when the impact plate 14 is loaded, the transition portion 30 plastically deforms. The first tubular member 26 of tubular member 12 telescopes into the second tubular member 28 of the tubular member 12. In this regard, the outer diameter of the first tubular member 26 must be configured along with the transition portion 30 to allow the collapse of the first tubular member 26 into the second tubular member 28 when the tube is axially loaded. A coupling bracket 16 functions to regulate the collapse of the tubular member 12 and prevent the first tubular member 26 from folding at the transition portion 30. In this way, the coupling bracket 16 allows for the telescopic collapse of the tubular member 12.

Figure 8:
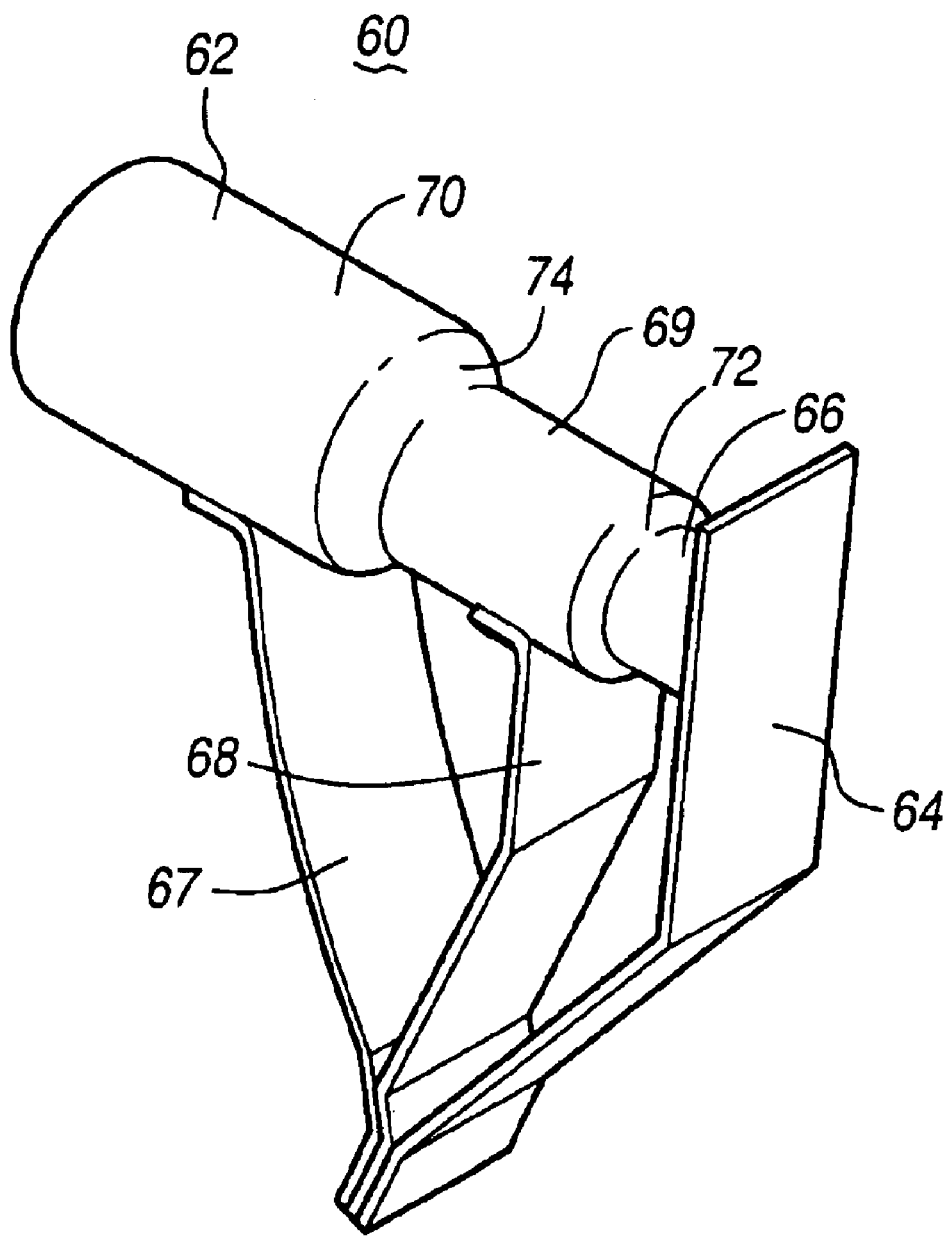
FIG. 8 represents an alternate embodiment of the present invention.

FIG. 8 represents an alternate embodiment of the present invention; specifically, a knee bolster bracket 60 having a tubular member 62, an impact plate 64, a first optional coupling bracket 67 and a second optional coupling bracket 68. Tubular portion 62 is defined having first, second and third tubular portions 66, 69, and 70. Disposed between the tubular portions 66, 69, and 70 are transition portions 72 and 74. While the knee bolster bracket 60 is shown having two coupling brackets 67 and 68, it is envisioned that only one coupling bracket 67 or 68 may be used. The knee bolster bracket 60, according to the second embodiment, functions in a manner similar to the functioning of the first knee bolster bracket 10. Specifically, the tube 62 is designed to collapse one or both the transition portions 74 and 72 while the coupling brackets 66 and 68 function to regulate the collapse of the tubular portion 62 so that it telescopically collapses under axial loading.

The first tubular portion 66 will be allowed to telescope into the second tubular portion 69 and/or the second tubular portion 69 will be allowed to telescopically collapse into the third tubular portion 70. In having knee bolster bracket structures that can collapse at two different locations, it is possible to tune the collapse so that the first tubular portion 66 collapses into the second tubular portion 69 at a first impact load while the second coupling mechanism collapses at a second impact load. This presents the option of designing the first impact region to collapse for a specific occupant type while the second collapsible region will collapse for a second occupant type. This allows the restraint engineer to design the displacement of the knee bolster for a given occupant.

Figure 9:
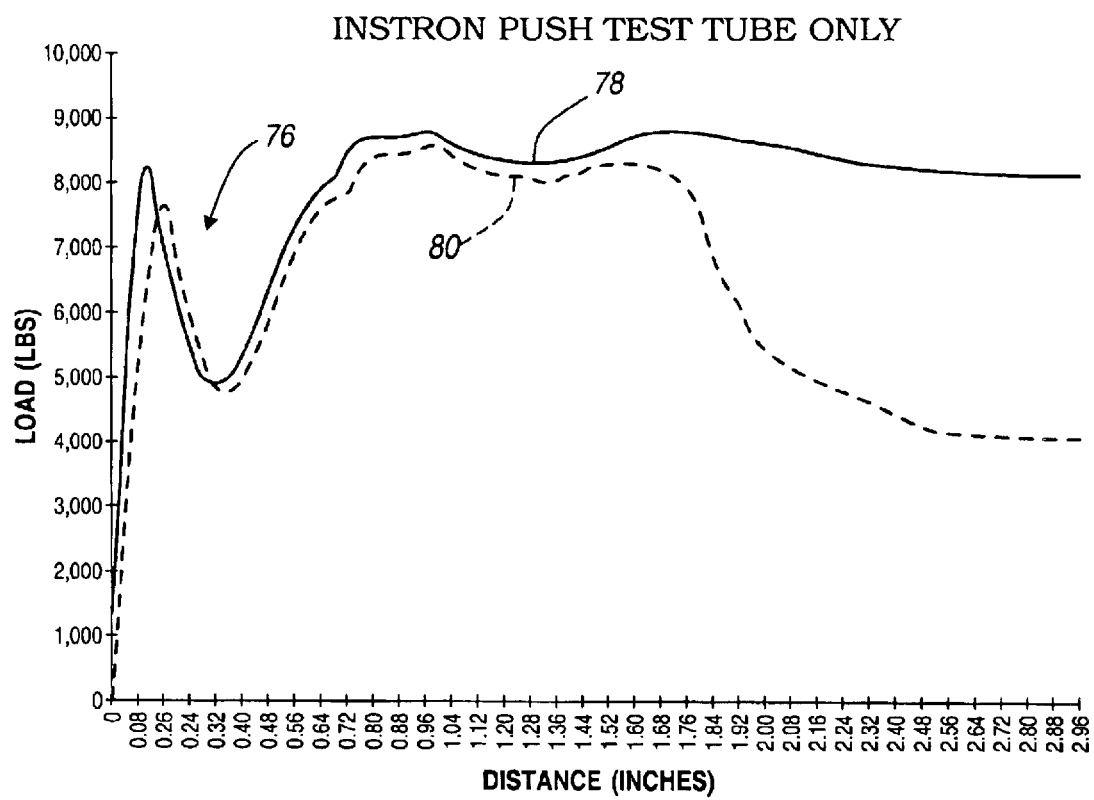
FIGS. 9 and 10 represent load versus displacement curves for the knee bolster according to the teachings of the first embodiments of the present invention.
Figure 10:
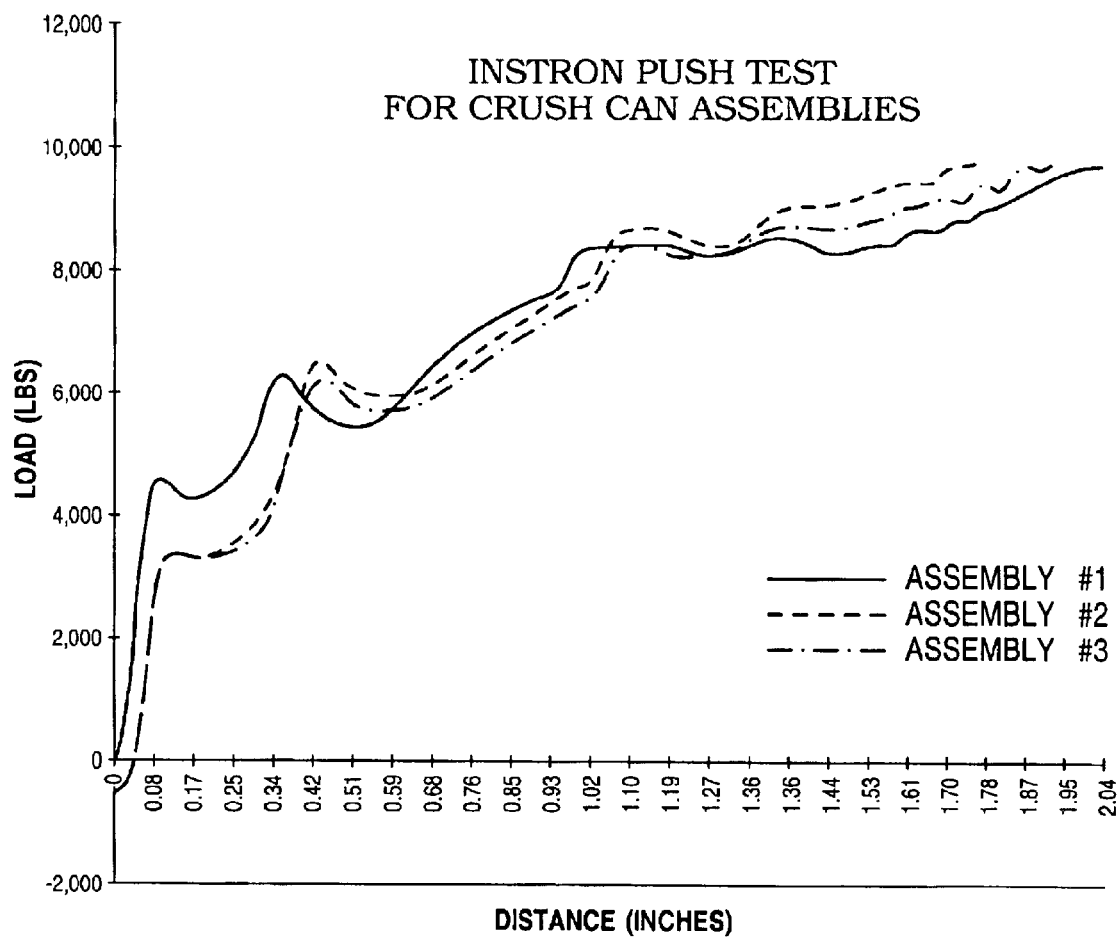

FIGS. 9 and 10 represent load versus displacement curves for brackets according to the teachings of the first embodiment of the invention. FIG. 9 depicts the axial loading of the collapsible tubular members 12 without having the associated coupling brackets. FIG. 10 depicts the collapsing of the bracket 10 according to the first embodiment of the invention. It should be noted that the first dip 76 within the load versus displacement curves 78 and 80 represent the initiation of plastic deformation of the transition portion 30 between the first and second tubular portions 26 and 28 of tubular member 12. As can be seen, as the first member 26 of tubular member 12 telescopes into the second tubular member 28, the load versus displacement curve represents a generally flat load without large spikes, which may indicate unacceptable loading on an occupant's femurs.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An energy absorbing member for use in a vehicle to support an interior trim component and absorb vehicle crash induced energy from a moving vehicle occupant comprising:
   a collapsible cylinder having a first end and a medial portion;
   an impact surface coupled to said first end;
   a coupling flange coupled to the impact surface and to the medial portion of the collapsible cylinder, wherein said collapsible cylinder is configured to axially collapse at a predetermined force when impacted by the moving occupant.

2. The energy absorbing member according to claim 1 wherein the collapsible cylinder has first and second coaxially aligned cylindrical portions.

3. The energy absorbing member according to claim 2 wherein said first cylindrical portion has a first perimeter with a smaller extent than an extent of the second perimeter of the second cylindrical portion.

4. The energy absorbing bracket according to claim 3 further comprising a transitionary portion disposed between said first and second cylindrical portions.

5. The energy absorbing member according to claim 4 wherein said transitionary portion comprises an exterior convex surface and an exterior concave surface.

6. The energy absorbing member according to claim 4 wherein said transititionary portion is configures to plastically deform at a predetermined load.

7. The energy absorbing member according to claim 2 wherein said first cylindrical portion has an exterior diameter smaller than the interior diameter of the second cylindrical portion.

8. The energy absorbing member according to claim 7 wherein the first cylindrical portion telescopically collapses into the second cylindrical member upon being impacted by an occupant.

9. The energy absorbing member according to claim 2 further comprising a third cylindrical portion, said third cylindrical portion being coaxially aligned to said second cylindrical portion, and a second transitionary portion disposed between said third cylindrical portion and said second cylindrical portion.

10. The energy absorbing member according to claim 9 further comprising a second coupling flange, said second coupling flange being coupled to said impact plate and to said third cylindrical portion.

11. The energy absorbing member according to claim 1 further comprising a cross-car beam.

12. The energy absorbing member according to claim 11 wherein said cross-car beam comprises a steering column and wherein said collapsible cylinder is positioned adjacent to said steering column.

13. A cross-car beam comprising:
    a first member disposed between two points within a vehicle compartment;
    a collapsible cylinder having first and second ends and an intermediate location disposed therebetween, the second end being coupled to the first member;
    an impact plate coupled to the first end;
    a coupling flange coupled to the impact plate and to the intermediate location of the collapsible cylinder, wherein said collapsible cylinder is configured to axially collapse at a predetermined force when impacted by a vehicle occupant.

14. The cross-car beam according to claim 13 wherein the collapsible cylinder has first and second coaxially aligned cylinder portions.

15. The cross-car beam according to claim 14 wherein the first cylindrical portion has an exterior diameter smaller than an interior diameter of the second cylindrical member, and wherein the cross-car beam further comprises a plastically deformable transitionary portion disposed between the first and second cylindrical members.

* * * * *